(57.)

THOMAS CHURCH.
Improvement in Clover Huller and Cleaner.
No. 122,568. Patented Jan. 9, 1872.

Witnesses:
G. Mathys.
C. A. Pettit

Inventor:
Thomas Church.
Per ——
Attorneys.

UNITED STATES PATENT OFFICE.

THOMAS CHURCH, OF LEWISBURG, PENNSYLVANIA.

IMPROVEMENT IN CLOVER-HULLERS AND CLEANERS.

Specification forming part of Letters Patent No. 122,568, dated January 9, 1872.

Specification describing certain Improvements in Clover-Huller and Cleaner, invented by THOMAS CHURCH, of Lewisburg, in the county of Union and State of Pennsylvania.

Figure 1:
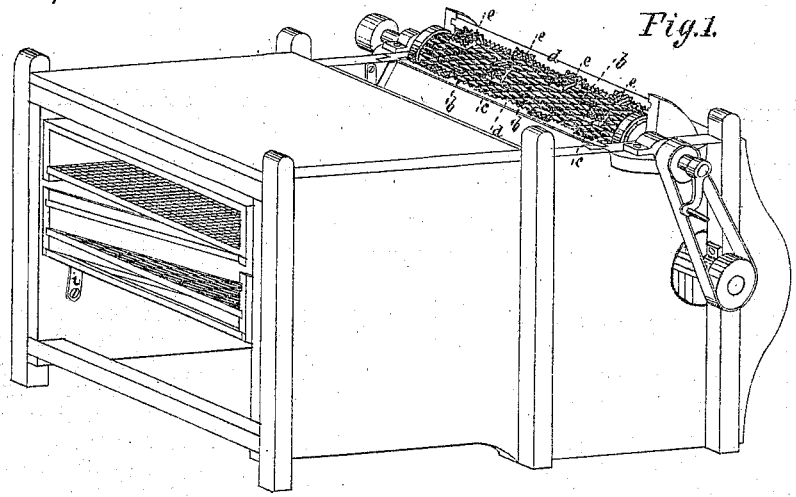
Figure 2:
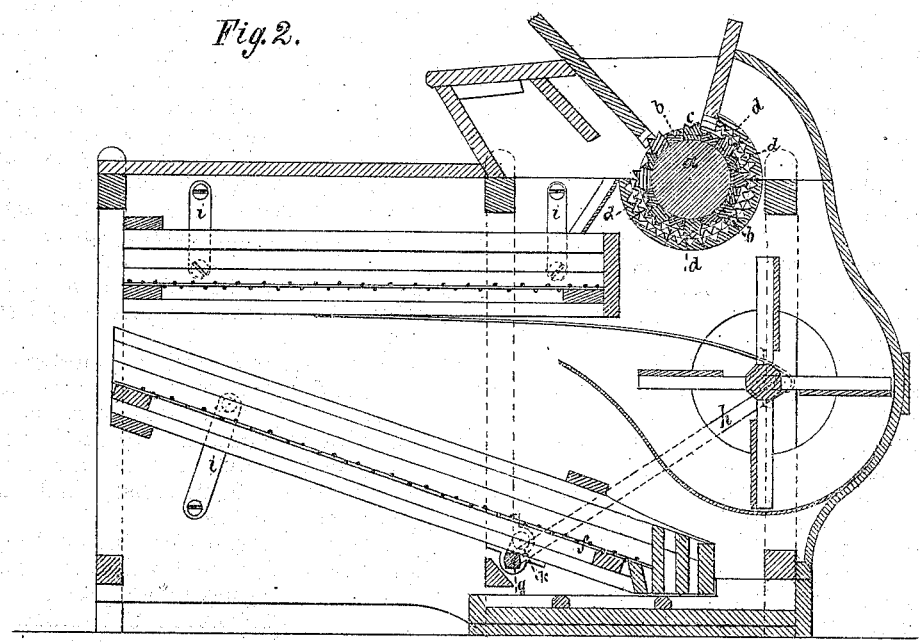
Figure 3:
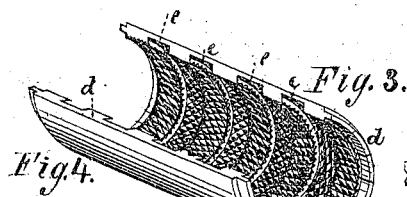
Figure 4:
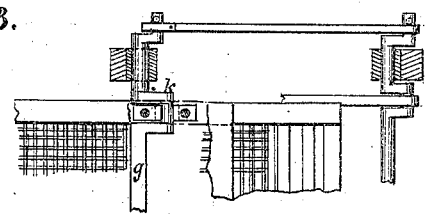

Figure 1 is a perspective view, with the hopper removed, showing the knobbed cylinder. Fig. 2 is a longitudinal vertical section through the whole machine; and Fig. 3 is a detached view, showing the connection of the inclined sieve with the crank-shaft that oscillates it. Fig. 4 is a perspective view of the bed or concave of the cylinder.

My invention relates to a hulling-cylinder provided with a roughened or diagonally-grooved surface, and also with knobs or raised toothed parts arranged on its periphery in circular rows, in combination with a correspondingly-constructed case—i. e., a case having a roughened interior surface divided at regular intervals by transverse grooves adapted to receive the aforesaid knobs. The invention likewise comprehends a sieve constructed and arranged as hereinafter described.

Referring to the drawing, $a$ is the wooden core of the hulling-cylinder, and $b$ the cast-iron staves set around the outside of the core $a$ and fastened at their ends in grooves in the cast-iron heads of the cylinder. The staves $b$ have raised parts or knobs $c$ disposed in rows around the periphery of the cylinder, at right angles to its axis, which knobs have roughened surfaces like the rest of the outside of the staves. The case is made in staves $d$, with roughened interior surfaces and with transverse grooves $e$, just deep enough to receive the knobs $c$. The knobs and grooves prevent the seeds from slipping endwise along the space between the cylinder and case, and insure the perfect stripping of the hulls from the seeds. The lower inclined sieve $f$ is hung at its lower end on a double crank-shaft, $g$, which is oscillated by means of a pitman, $h$, connecting one end of said shaft with a crank, $k$, on the end of the fan-shaft. The upper end of the sieve is hung on bars $i$. The shaft $g$ communicates both an upward and downward and a backward and forward motion to the lower end of the sieve. The upward motions knock the dust that falls with the seed down upon the sieve $f$ upward from the same, and when it settles down again it falls nearer the lower ends of the sieve every time, so that finally all the dust gets tailed off from the sieve, leaving the seed clear.

I do not claim a hulling-cylinder provided with teeth raised above its general surface, nor a sieve arranged to receive the peculiar reciprocatory and circular movement above described; but

Having thus described my invention, what I claim as new, and desire to secure by Letters Patent, is—

1. The hulling-cylinder, having a roughened surface between the teeth or knobs $c$ $c$, which are arranged to project in circular rows, in combination with the case $d$, provided with transverse toothed grooves $e$ $e$ and a roughened surface between them, substantially as and for the purpose specified.

2. The sieve $f$, arranged with the hulling-cylinder and case, constructed with the raised knobs and grooves, as shown and described.

THOMAS CHURCH.

Witnesses:
   THOMAS D. D. OURAND,
   CHAS. A. PETTIT.